(12) United States Patent
Bonwick et al.

(10) Patent No.: US 10,127,113 B1
(45) Date of Patent: Nov. 13, 2018

(54) METHOD AND SYSTEM FOR CHECKERBOARD RAID

(71) Applicant: EMC Corporation, Hopkinton, MA (US)

(72) Inventors: Jeffrey S. Bonwick, Santa Clara, CA (US); Haleh Tabrizi, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 15/086,429

(22) Filed: Mar. 31, 2016

(51) Int. Cl.
*G06F 11/10* (2006.01)

(52) U.S. Cl.
CPC ........ *G06F 11/1096* (2013.01); *G06F 11/108* (2013.01); *G06F 2201/845* (2013.01)

(58) Field of Classification Search
CPC ............... G06F 11/1096; G06F 11/108; G06F 11/0766; G06F 11/1008; G06F 11/1044; G06F 11/0793; G06F 3/0608; G06F 3/0613; G06F 3/0653
See application file for complete search history.

(56) References Cited

U.S. PATENT DOCUMENTS

| | | | |
|---|---|---|---|
| 6,351,838 B1 | 2/2002 | Amelia | |
| 7,398,418 B2 | 7/2008 | Soran et al. | |
| 7,406,621 B2 | 7/2008 | Lubbers et al. | |
| 7,543,100 B2 | 6/2009 | Singhal et al. | |
| 7,752,389 B1 | 7/2010 | Fan | |
| 7,934,120 B2 | 4/2011 | Zohar et al. | |
| 8,078,906 B2 | 12/2011 | Yochai et al. | |
| 8,145,840 B2 | 3/2012 | Koul et al. | |
| 8,200,887 B2 | 6/2012 | Bennett | |
| 8,489,979 B2 * | 7/2013 | Rub | G06F 11/1012 714/755 |
| 8,782,505 B2 * | 7/2014 | Rub | G06F 11/1012 714/756 |

(Continued)

FOREIGN PATENT DOCUMENTS

| | | |
|---|---|---|
| EP | 1577774 A2 | 9/2005 |
| JP | 2004-326759 A | 11/2004 |

(Continued)

OTHER PUBLICATIONS

Anvin H., "The mathematics of RAID-6", retrieved from the internet at http://www.cs.utk.edu/"plank/plank/papers/CS-96-332.html, Jan. 20, 2004 (9 pages).
Kazmi, A., "PCI Express™ Basics & Applications in Communication Systems," PCI-SIG Developers Conference, 2004 (50 pages).

(Continued)

*Primary Examiner* — Nadeem Iqbal
(74) *Attorney, Agent, or Firm* — Chamberlain, Hrdlicka, White, Williams, & Aughtry

(57) ABSTRACT

A system and method for storing data including receiving a request to write data and in response to the request selecting a set of free physical locations in persistent storage. The system and method further include determining an aggregate failure rate of the set of free physical locations, making a first determination that the aggregate failure rate is less than a failure rate threshold for the persistent storage and based on the first determination calculating a parity value using at least a portion of the data, and writing the data and the parity value to the set of free physical locations.

20 Claims, 8 Drawing Sheets

(56) References Cited

U.S. PATENT DOCUMENTS

| | | | |
|---|---|---|---|
| 9,529,674 B2* | 12/2016 | Pereira | |
| 2002/0161972 A1 | 10/2002 | Talagala et al. | |
| 2004/0153961 A1 | 8/2004 | Park et al. | |
| 2004/0225926 A1 | 11/2004 | Scales et al. | |
| 2005/0166083 A1 | 7/2005 | Frey et al. | |
| 2005/0223156 A1 | 10/2005 | Lubbers et al. | |
| 2006/0085594 A1 | 4/2006 | Roberson et al. | |
| 2008/0109602 A1 | 5/2008 | Ananthamurthy et al. | |
| 2008/0168225 A1 | 7/2008 | O'Connor | |
| 2009/0187786 A1 | 7/2009 | Jones et al. | |
| 2010/0199125 A1* | 8/2010 | Reche | G06F 11/108 714/6.22 |
| 2012/0079318 A1 | 3/2012 | Colgrove et al. | |
| 2012/0089778 A1 | 4/2012 | Au et al. | |
| 2012/0166712 A1 | 6/2012 | Lary | |
| 2016/0148708 A1* | 5/2016 | Tuers | G11C 29/38 714/719 |

FOREIGN PATENT DOCUMENTS

| | | |
|---|---|---|
| JP | 2010-508604 A | 3/2010 |
| WO | 2008054760 A2 | 5/2008 |

OTHER PUBLICATIONS

Percival, D., "Multicast Over PCT Express®," PCI-SIG Developer's Conference Europe, 2009 (33 pages).

Huffman, A., NVM Express Revision 1.0b, Jul. 12, 2011 (126 pages).

Regula, J., Using Non-transparent Bridging in PCI Express Systems, Jun. 1, 2004 (31 pages).

International Search Report issued in PCT/US2013/033224 dated Jul. 31, 2013 (3 pages).

Written Opinion of the International Searching Authority issued in PCT/US2013/033224 dated Jul. 31, 2013 (10 pages).

International Preliminary Report on Patentablility in corresponding International Application No. PCT/US2013/033224 dated Oct. 2, 2014 (2 pages).

Written Opinion of the International Searching Authority issued in PCT/US2013/033224 dated Oct. 2, 2014 (10 pages).

Minoru Uehara, Orthogonal Raid with Multiple Parties in Virtual Large-Scale Disks, IPSJ SIG Technical Report, vol. 2011-DPS-149 No. 4, Nov. 24, 2011 [CD-ROM], IPSJ, Nov. 24, 2011, pp. 1-8 (10 pages).

Office Action in corresponding Japanese application 2015-501902 dated Oct. 6, 2015 (6 pages).

* cited by examiner

US 10,127,113 B1

METHOD AND SYSTEM FOR CHECKERBOARD RAID

BACKGROUND

In order to protect against potential loss of data in a storage system, it is often advantageous to implement a replication scheme. Current replication schemes are only able to sustain a limited amount of error before data within the storage system is unable to be read.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description In the following description of FIGS. 1-5D, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to storing data in a storage array using a RAID scheme. More specifically, the RAID scheme uses information about the failure rates of the storage devices in order to select physical locations on the individual storage devices in which to store data.

For purposes of this technology, the term "RAID" as used herein refers to "Redundant Array of Independent Disks." While "RAID" refers to any array of independent disks, embodiments of the technology may be implemented using any type of persistent storage device.

Figure 1:
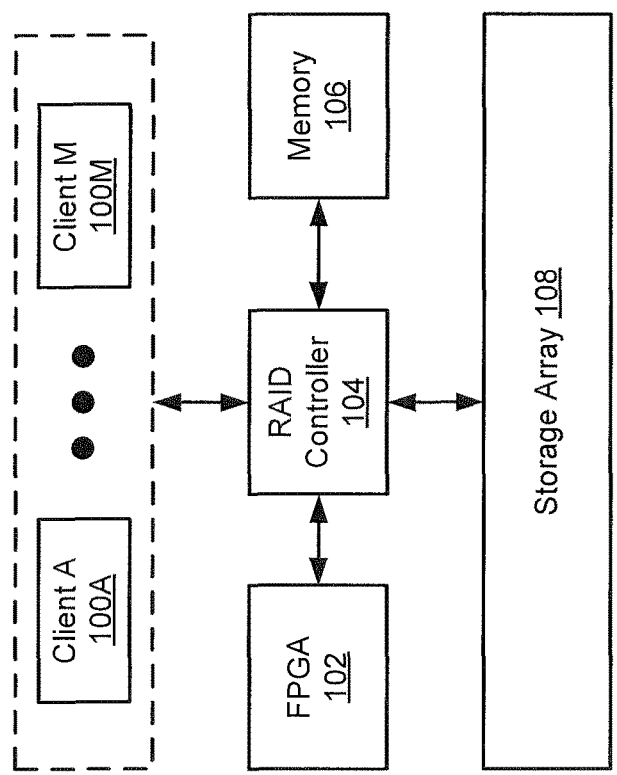
FIG. 1 shows a system in accordance with one embodiment of the technology.

FIG. 1 shows a system in accordance with one embodiment of the technology. As shown in FIG. 1, the system includes one or more clients (100A, 100M), a RAID controller (104), memory (106), optionally a Field Programmable Gate Array (FPGA) (102), and a storage array (108). Each of these components is described below.

In one embodiment of the technology, a client (100A, 100M) is any system or process executing on a system that includes functionality to issue a read request or a write request to the RAID controller (104). In one embodiment of the technology, the clients (100A, 100M) may each include a processor (not shown), memory (not shown), and persistent storage (not shown). In one embodiment of the technology, the RAID controller (104) is configured to implement a RAID scheme, which includes writing data to the storage array (108) in a manner consistent with embodiments described in FIGS. 2-5D. Further, the RAID controller includes functionality to read data (including reconstructing data) from the storage array (108). In one embodiment of the technology, the RAID controller (104) includes a processor configured to execute instructions to implement one or more embodiments of the technology, where the instructions are stored on a non-transitory computer readable medium (not shown) that is located within or that is operatively connected to the RAID controller (104). Alternatively, the RAID controller (104) may be implemented using hardware. Those skilled in the art will appreciate that the RAID controller (104) may be implemented using any combination of software and/or hardware.

In one embodiment of the technology, the RAID controller (104) is operatively connected to memory (106). The memory (106) may be any volatile memory including, but not limited to, Dynamic Random-Access Memory (DRAM), Synchronous DRAM, SDR SDRAM, and DDR SDRAM. In one embodiment of the technology, the memory (106) is configured to temporarily store various data (including parity data) prior to such data being stored in the storage array.

In one embodiment of the technology, the FPGA (102) (if present) includes functionality to calculate parity values (e.g., P parity value, Q parity value) for purposes of storing data in the storage array (108) and/or functionality to perform various calculations necessary to recover corrupted data stored using the RAID scheme. The RAID controller (104) may use the FPGA (102) to offload the processing of various data in accordance with one or more embodiments of the technology.

In one embodiment of the technology, the storage array (108) includes one or more storage devices (SDDs). Each storage device includes persistent storage media. Examples of storage devices include, but are not limited to, magnetic memory devices, optical memory devices, phase change memory devices, solid state memory devices, tape drives, any other suitable type of persistent memory device, or any combination thereof.

Those skilled in the art will appreciate that while FIG. 1 shows an FPGA, the technology may be implemented without an FPGA. Further, those skilled in the art will appreciate that other components may be used in place of the FPGA without departing from the technology. For example, the technology may be implemented using an Application Specific Integrated Circuit(s) (ASIC), a graphics processing unit(s) (GPU), a general purpose processor(s), any other hardware device capable of calculating parity values for purposes of storing data in the storage array and/or performing various calculations necessary to recover corrupted data stored using the RAID scheme, any device that includes a combination of hardware, firmware, and/or software configured to calculate parity values for purposes of storing data in the storage array (108) and/or to perform various calculations necessary to recover corrupted data stored using the RAID scheme, or any combination thereof.

Those skilled in the art will appreciate that the technology is not limited to the configuration shown in FIG. 1.

Figure 2:
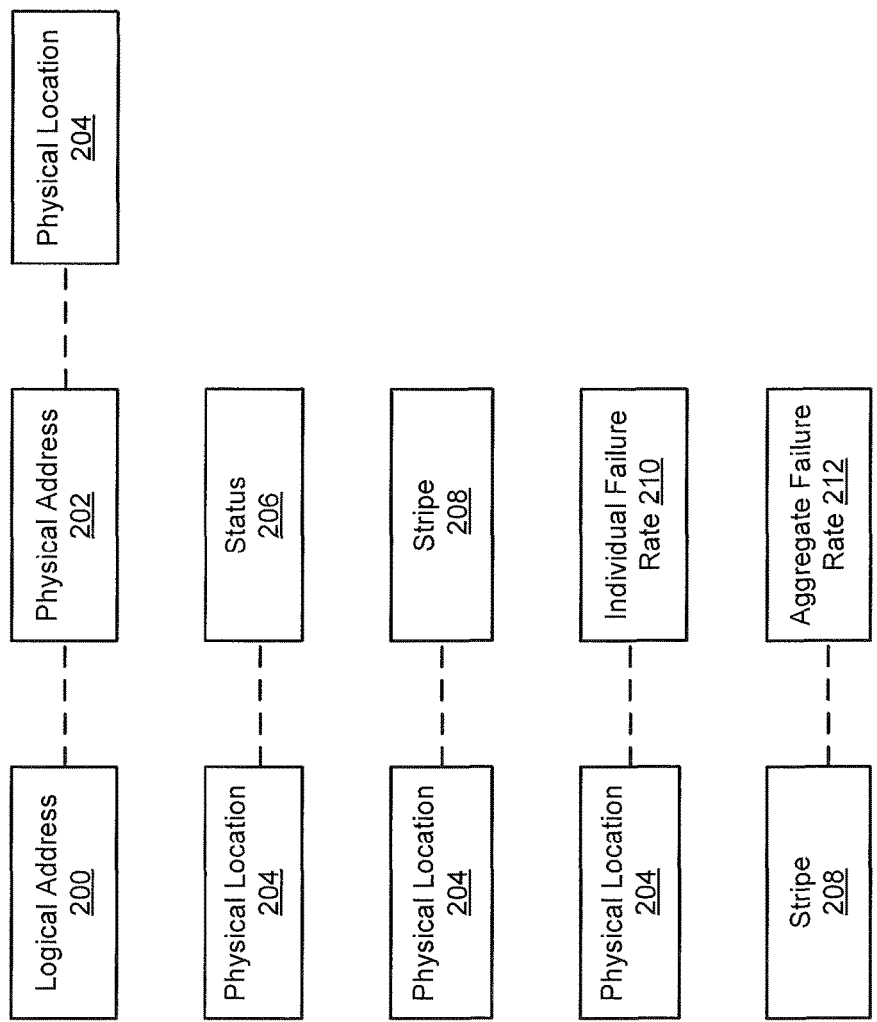
FIG. 2 shows data structures in accordance with one embodiment of the technology.

FIG. 2 shows the relationship between the various components in the system. In one embodiment of the technology, the RAID controller (104) may maintain data structures to track one or more of the relationships below.

In one or more embodiments of the technology, each physical location (204) in the storage array is associated with a logical address (200) and a physical address (202). Further, for each physical address (202), the RAID controller may track the following information: (i) status (206), which indicates whether the block is a free block or an occupied block; (ii) stripe (208) membership, i.e., whether the physical location is part of a stripe (see e.g., FIGS. 5A-5D) and, if so, which stripe (208) in the storage array; (iii) individual failure rate (210), which indicates that likelihood that a read or write failure will occur at the physical location. Further, the RAID controller may also track an aggregate failure rate (212) for a stripe, which is an aggregate of the individual failure rates (210) of each physical location (204) in a particular stripe (208).

In one embodiment of the technology, the individual failure rate (210) may be calculated by the RAID controller. Alternatively, the RAID controller may obtain the individual failure rates (210) from an external source. In another embodiment of the technology, the individual failure rate (210) of a given physical location may be a function of the number of program/erase (P/E) cycles that have been performed on the particular physical location. In such cases, the RAID controller may track the P/E cycles (e.g., tracked as P/E cycle value) for each of the physical locations in the storage array and then calculate the individual failure rate (210) for each of the physical locations using this information.

The P/E cycle value may represent: (i) the number of P/E cycles that have been performed on the physical location defined by the physical address or (ii) a P/E cycle range (e.g., 5,000-9,999 P/E cycles), where the number of P/E cycles that have been performed on the physical location (204) defined by the physical address (202) is within the P/E cycle range. In one embodiment of the technology, a P/E cycle is the writing of data to one or more pages in an erase block (i.e., the smallest addressable unit for erase operations, typically, a set of multiple pages) and the erasure of that block, in either order. In one embodiment of the technology, the physical location (204) corresponds to page. The P/E cycle values may be stored per physical location per set of physical locations, or and/or at any other level of granularity. In one embodiment of the technology, the P/E cycle values may be stored on a per page basis, a per block basis, on a per set of blocks basis, and/or at any other level of granularity. The RAID controller includes functionality to update, as appropriate, the P/E cycle values when data is written to (and/or erased from) physical locations in the storage array.

Figure 3:
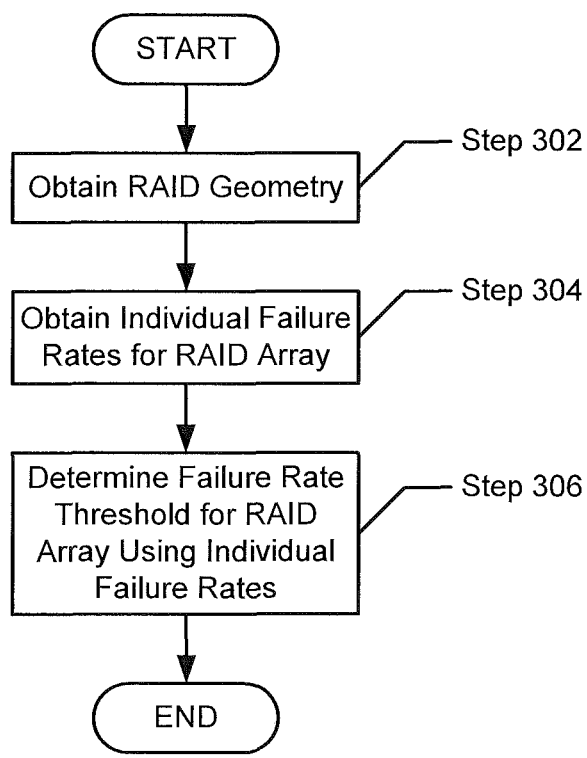
FIG. 3 shows a flowchart for implementing a RAID Failure Rate Threshold determination in accordance with one or more embodiments of the technology.
Figure 4:
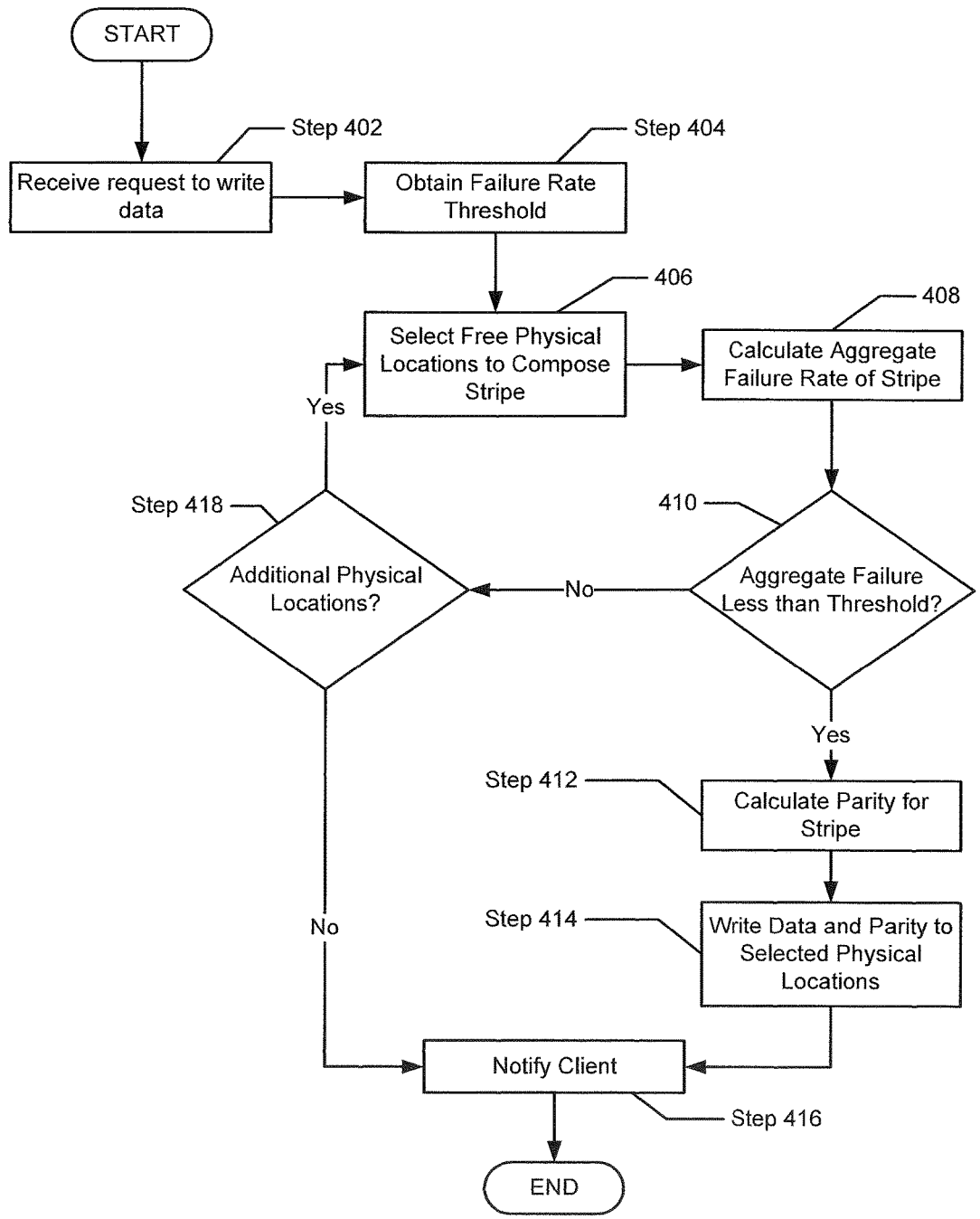
FIG. 4 shows a flowchart for implementing a RAID write operation in accordance with one or more embodiments of the technology.

FIGS. 3-4 show flowcharts in accordance with one or more embodiments of the technology. More specifically, FIGS. 3-4 show a method for storing data in a storage array in accordance with one or more embodiments of the technology. While the various steps in the flowchart are presented and described sequentially, one of ordinary skill will appreciate that some or all of the steps may be executed in different orders, may be combined or omitted, and some or all of the steps may be executed in parallel. In one embodiment of the technology, the methods shown in FIGS. 3-4 may be performed in parallel.

FIG. 3 shows a flowchart for determining a failure rate threshold determination in accordance with one or more embodiments of the technology. In step 302, the RAID controller obtains information about the storage array. Specifically, the RAID controller may obtain information about the number of disks or SSDs in the storage array, the width of a stripe (e.g., the number of physical locations associated with each RAID stripe), the type of RAID scheme being implemented (e.g., RAID 4, RAID 5, etc.). In step 304, the individual failure rates are obtained for each of the disks and/or SSDs in the storage array. The individual failure rates may be determined in the manner described above.

In step 306, the RAID controller determines a failure rate threshold based upon the individual failure rate data obtained in step 304. In one embodiment of the technology, the failure rate threshold is determined such that a sufficient number of stripes with an aggregate failure rate that is less than or equal to the failure rate threshold may be stored in the storage array. For example, if the failure rate threshold is set lower than the average individual failure rate for physical locations in the storage array, then only a limited number of physical locations may be used to generate stripes that have an aggregate failure rate that is less than or equal to the failure rate threshold. This may result in inefficient usage of the storage array. Alternatively, if the failure rate threshold is set higher than the average individual failure rate for physical locations in the storage array, then a large number of stripes that have an aggregate failure rate that is less than or equal to the failure rate threshold may be stored in the storage array. While this may result in a more efficient usage of the storage array, this may also result in stripes in the storage array that have a wide range of aggregate failure rate thresholds.

In one embodiment of the technology, the failure rate threshold is determined experimentally using the information about in steps 302 and 304. Alternatively, a model for determining failure rate thresholds for storage arrays may be implemented by the RAID controller, where the model takes the information obtained in steps 302 and 304 as input and outputs a failure rate threshold.

In one embodiment of the technology, the RAID controller may take an average of the individual failure rates (obtained in step 304) and determine an acceptable deviation from the average. The acceptable deviation may be, for example, 5%40% from the average. Those skilled in the art will appreciate that the acceptable deviation may cover a varying range based upon the load of the system, criticality of the data, or other profile information conveyed to the RAID controller by an administrator or other third party. The RAID controller may use the aforementioned acceptable deviation to filter out outliers in set of individual failure rates obtained in step 304. The failure rate threshold may then be determined using the resulting set of individual failure rates.

The process depicted in FIG. 3 may be initiated at any time by the RAID controller. For example, the method shown in FIG. 3 may be performed after a predetermined period, if a threshold of write errors is reached for a given disk or SSD, when a disk or SDD is replaced, when a certain number of P/E cycles has been performed on the persistent storage, etc. Further, the process may also be initiated by an administrator or other third party. In one embodiment of the technology, the frequency at which the method shown in FIG. 3 is performed may be determined, at least in part, by the load on the RAID controller (e.g., the method shown in FIG. 3 may be initiated during lower volumes of read or write requests).

FIG. 4 shows a flowchart for implementing a RAID write operation in accordance with one or more embodiments of the technology. In Step 402, a request to write data is received from a client. In step 404, the RAID controller obtains the failure rate threshold. In one embodiment of the technology, because the failure rate threshold may change over time, step 404 is performed in scenarios in which the failure rate of the storage array changes over time. In scenarios in which the failure rate thresholds for the storage array do not change over time, step 404 may be performed only once by the RAID controller.

In step 406, the RAID controller selects a set of free physical locations to be part of a new RAID stripe. The set of free physical locations may be determined by obtaining the set of free physical locations in the storage array and then selecting a number of physical locations corresponding stripe width. For example, if the stripe width is five, then five physical locations are selected. Further, the selection of the physical locations for the stripe may also take into account in the independent fault domains (IFDs) with which the physical locations are associated. In one or more embodiments of the technology, an IFD corresponds to a failure mode which results in the data at a given location being inaccessible. Each IFD corresponds to an independent mode of failure in the storage array. For example, if the data is stored in a storage array that includes SSD that include NAND flash, then the IFDs may be (i) SSD and (ii) NAND die within the SSD. Accordingly, the physical locations for the stripe, in one embodiment of the technology, are distributed across at least one IFD. For example, if the IFD is disks, then the physical locations for the stripe may be selected such that each physical location is on a separate disk.

In step 408, the RAID controller obtains the individual failure rate of each physical location in the new RAID stripe determined in step 406 and calculates the aggregate failure rate of the new RAID stripe based upon the individual failure rates. The aggregate failure rate may be calculated according to one or more mathematical formulas. For example, the aggregate failure rate may be the average of the individual failure rates.

In step 410, the RAID controller determines whether or not the calculated aggregate failure rate exceeds the failure rate threshold that determined in step 306. If the calculated aggregate failure rate is below the failure rate threshold, then the method proceeds to step 412; otherwise the method proceeds to step 418.

In one embodiment of the technology, in step 410, RAID controller may determine whether the aggregate failure rate of the stripe is greater than or equal to a minimum failure rate threshold and less than or equal to a maximum failure rate threshold. In this scenario, the aggregate failure rate threshold is within a range. The size of the range may vary based on the implementation of the technology.

Continuing with the discussion of FIG. 4, in step 412, the RAID controller (or the FPGA) calculates the parity values for the RAID stripe (e.g., P-parity, Q-parity, etc.). In step 414, the RAID controller writes the data (obtained in step 402) and the parity value(s) (obtained in step 412) to the physical locations in the RAID stripe (determined in step 406). In one or more embodiments the RAID controller may also take into account the individual failure rates when determining which data is stored in which physical locations. For example, some data may have a higher priority than other data and thus, would be written to a physical location in a RAID stripe with a lower individual failure rate. In one or more other embodiments the RAID controller may write the parity to the physical location having the highest individual failure rate.

In step 416, the RAID controller notifies the client of a successful write operation.

Returning to step 410, if the calculated aggregate failure rate exceeds the failure rate threshold in step 410, the RAID controller proceeds to step 418. In step 418, the RAID controller determines whether there are other combinations of free physical locations that may be selected for the new RAID stripe. If there are other combinations available, then the process proceeds to step 406. If there are no other combinations available, then the RAID controller notifies the client in step 416 that the write operation has failed.

In one or more embodiments of the technology the failure to select a RAID stripe of locations that has an aggregate failure rate within the failure rate threshold may trigger the RAID controller to calculate a new failure rate threshold, i.e. proceed to step 302 of FIG. 3. In one or more alternative embodiments of the technology the failure to select a RAID stripe of locations that has an aggregate failure rate within the failure rate threshold may trigger a service condition or notification to indicate that one or more of the SDDs should be repaired or replaced.

In one or more embodiments of the technology, the RAID controller may pre-determine one or more RAID stripes that have an aggregate failure rate within the failure rate threshold. In other words, in one or more embodiments, the RAID controller may proactively perform, e.g., steps 406-410. In one or more embodiments, the RAID controller may randomly select free physical locations to compose one or more of the pre-determined RAID stripes that have an aggregate failure rate within the failure rate threshold. In one or more alternative embodiments, the selection of free physical locations for inclusion in a particular RAID stripe may be random, according to a particular pattern (e.g. linear, checkerboard, or other patterns), or according to some other selection scheme.

In one or more embodiments, the RAID controller may store a list of pre-determined RAID stripe(s) that have an aggregate failure rate within the failure rate threshold. Further, in one or more embodiments, the RAID controller may generate the list of pre-determined RAID stripe(s) during, e.g., the failure rate threshold determination as described in FIG. 3.

In one or more embodiments, the RAID controller may use a list of pre-determined RAID stripes that are within the failure rate threshold. In other words, in one or more embodiments, the RAID controller may, in response to receiving a write request in step 402, select one of the pre-determined RAID stripes and then proceed to step 412.

The following section describes various examples in accordance with one or more embodiments of the technology. The examples are not intended to limit the scope of the technology.

FIGS. 5A-5D show examples in accordance with one or more embodiments of the technology. While FIGS. 5A-5D show examples of a RAID system with particular geometries, those skilled in the art will appreciate that the technology is not limited to such geometries and applies to other RAID implementations.

Figure 5A:
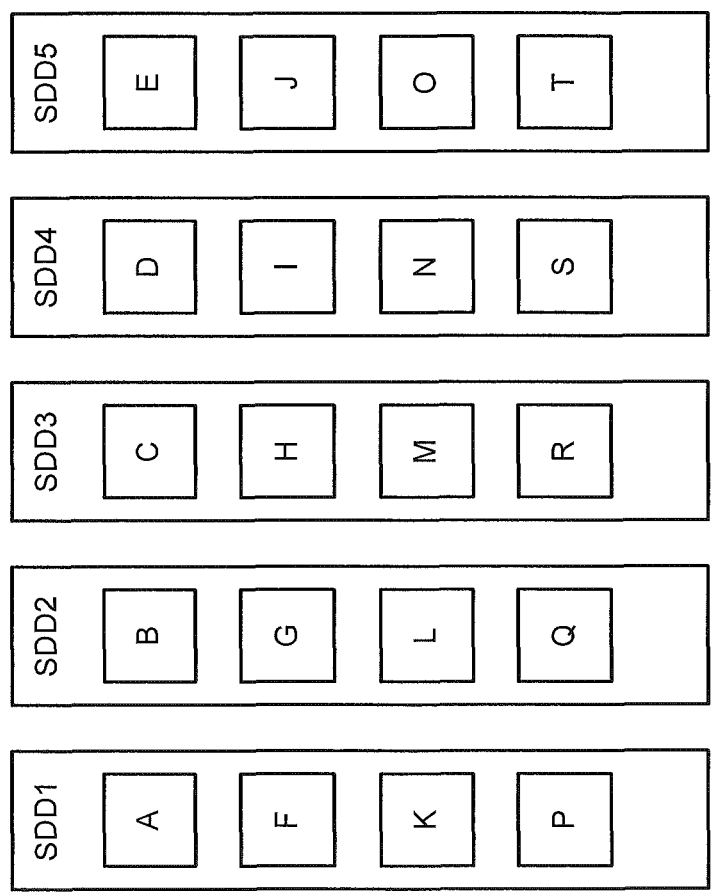
FIGS. 5A-5D show examples in accordance with one or more embodiments of the technology.
Figure 5B:
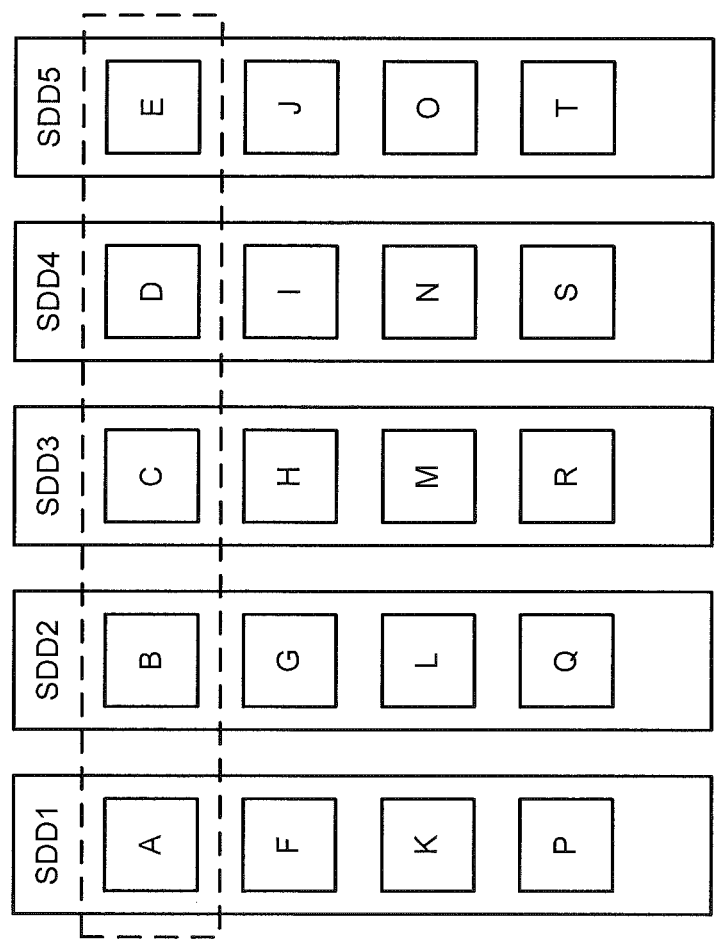
Figure 5C:
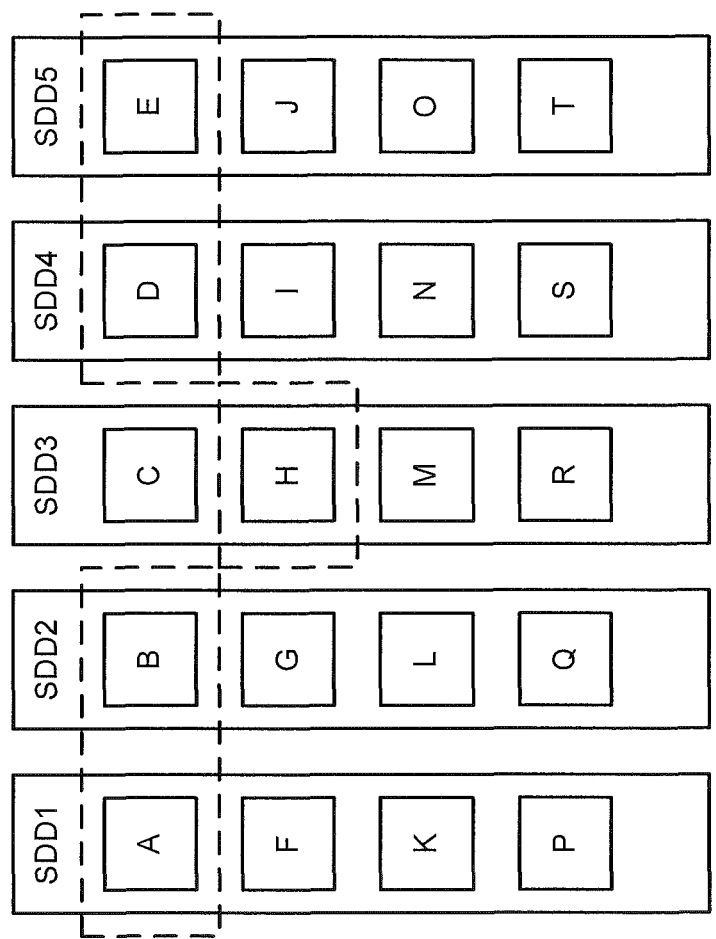
Figure 5D:
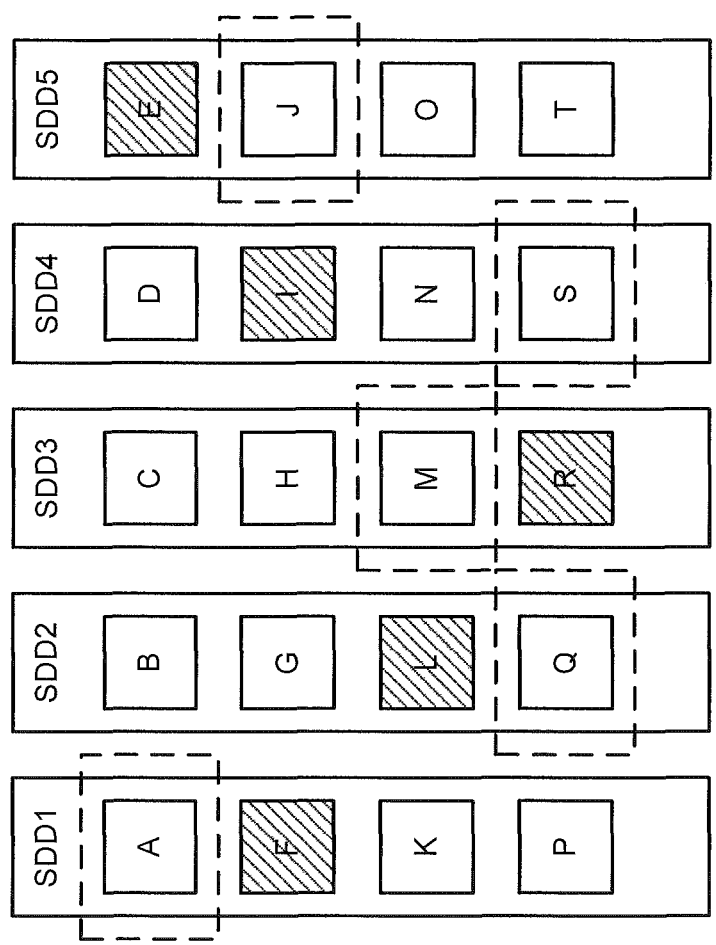

Referring to FIG. 5A, a storage array in accordance with one or more embodiments of the technology may have, for example, five SDDs (SDD1-SDD5). Further, each SDD in this example has four physical storage locations. Accordingly, the total storage of the example system is 20 physical storage locations labeled A-T. Each physical location has an individual failure rate that corresponds to a probability or percentage that the location will become corrupt.

Consider a scenario in which all the physical locations are initially free and a write request is subsequently received. In response to receiving the write request, the RAID controller selects the first linear set of free physical locations A-E. See FIG. 5B.

Once the RAID controller selects the free physical locations A-E to compose the RAID stripe, the RAID controller calculates the aggregate failure rate of the RAID stripe by obtaining the individual failure rates of each physical location as discussed above. Assuming that the aggregate failure rate is less than the failure rate threshold, the RAID controller then calculates the parity and writes the parity and data to the physical locations A-E. However, if the aggregate failure rate is not less than the failure rate threshold, the RAID controller cannot write to the selected RAID stripe of free physical locations and must select a new RAID stripe.

In the instant example assume that the aggregate failure rate of free physical locations A-E is greater than a failure threshold rate. Accordingly, referring to FIG. 5C, the RAID controller selects a new set of physical locations to be included in the stripe (i.e., physical locations A, B, H, D, and E). In one or more embodiments the RAID controller may select the new RAID stripe by selecting an entirely new set of locations. Alternatively, in other embodiments the RAID controller may determine the physical location with the highest individual failure rate, e.g. C, and replace it with a new physical location, e.g. H. Assuming that the aggregate failure rate of the new RAID stripe is less than the failure rate threshold, the RAID controller then calculates the parity and writes the parity and data to the physical locations A, B, H, D, and E. However, if the aggregate failure rate is not less than the failure rate threshold, the RAID controller cannot write to the selected RAID stripe of free physical locations and must again select a new RAID stripe.

In the instant example assume that the aggregate failure rate of free physical locations A-E is greater than a failure threshold rate. Accordingly, referring to FIG. 5D, the RAID controller selects another set of physical locations (i.e., physical locations A, Q, H, N, and J). Again, the RAID controller may select the new RAID stripe by selecting an entirely new set of locations. Alternatively, in other embodiments the RAID controller may selectively replace physical locations with other physical locations. In this example, A remains in the selected set, B is replaced with Q, H is replaced with M, D is replaced with S, and E is replaced with J. The RAID controller may also take into account locations which are free and those that are not free. For example, in FIG. 5D, physical locations F, L, R, I and E may not be free (i.e., they currently store data or have been designated as unavailable because the individual failure rate of the physical locations is such that data should not be written to this physical location).

Those skilled in the art will appreciate that while the technology has been described with respect to a single dimension RAID scheme, embodiments of the technology may be extended to any multi-dimensional RAID scheme. For example, embodiments of the technology may be extended to the multi-dimensional RAID scheme described in U.S. Pat. No. 8,316,260 (which is hereby incorporated by reference).

Advantageously, systems and methods implementing one or more embodiments of the technology may exhibit failure rate improvements on a per-stripe basis by a factor substantially between 4 and 5.

One or more embodiments of the technology may be implemented using instructions executed by one or more processors in the system. Further, such instructions may correspond to computer readable instructions that are stored on one or more non-transitory computer readable mediums.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for storing data comprising:
   receiving a request to write data;
   in response to the request:
      selecting a first set of free physical locations across a plurality of storage devices to form a first new redundant array of independent disks (RAID) stripe, wherein each free physical location is distributed across an independent fault domain (IFD);
      determining a first aggregate failure rate of the first new RAID stripe;
      making a first determination that the first aggregate failure rate exceeds a failure rate threshold for the plurality of storage devices;
      selecting, based on the first determination, a second set of free physical locations across the plurality of storage devices to form a second new RAID stripe, comprising:
         replacing a first free physical location of the first set of free physical locations with a second free physical location across the plurality of storage devices, wherein the first and second free physical locations reside on the same storage device;
      determining a second aggregate failure rate of the second new RAID stripe;
      making a second determination that the second aggregate failure rate is less than the failure rate threshold for the plurality of storage devices;
      based on the second determination:
         calculating a parity value using at least a portion of the data; and
         writing the data and the parity value to the second set of free physical locations forming the second new RAID stripe.

2. The method of claim 1, further comprising:
   prior to making the first determination:
      obtaining a plurality of individual failure rates associated with the plurality of storage devices; and
      determining the failure rate threshold using at least a portion of the plurality of individual failure rates.

3. The method of claim 1, further comprising:
   after writing the data and the parity value to the second set of physical free physical locations forming the second new RAID stripe:
      obtaining a second plurality of individual failure rates for the plurality of storage devices; and
      determining a second failure rate threshold using at least a portion of the second plurality of individual failure rates, wherein the second failure rate threshold is different than the failure rate threshold.

4. The method of claim 1, further comprising:
   after writing the data and the parity value to the second set of physical free physical locations forming the second new RAID stripe and after at least a portion of the plurality of storage devices is replaced to obtain a second plurality of storage devices:
  obtaining a second plurality of individual failure rates for the second plurality of storage devices; and
  determining a second failure rate threshold using at least a portion of the second plurality of individual failure rates, wherein the second failure rate threshold is different than the failure rate threshold.

5. The method of claim 1, further comprising:
receiving a second request to write second data;
in response to the second request:
  selecting a third set of free physical locations across the plurality of storage devices to form a third new RAID stripe;
  determining a third aggregate failure rate of the third new RAID stripe;
  making a third determination that the third aggregate failure rate exceeds the failure rate threshold for the plurality of storage devices;
  based on the third determination:
    making a fourth determination that there are no additional combinations of free physical locations to select; and
    based on the fourth determination:
      issuing an error notification to a client that issued the second request.

6. The method of claim 5, further comprising:
after making the fourth determination, initiating an updating of the failure rate threshold.

7. The method of claim 1, wherein the plurality of storage devices comprises solid state storage.

8. The method of claim 1, wherein writing the data and the parity value to the second set of free physical locations forming the new second RAID stripe, comprises:
  determining a first physical location in the second set of free physical locations that has a highest individual failure rate; and
  writing the parity value to the first physical location.

9. A system, comprising:
  a storage array comprising a plurality of storage devices (SDs); and
  a controller operatively connected to the storage array and configured to:
    receive a request to write data;
    in response to the request:
      select a first set of free physical locations in the plurality of SDs to form a first new redundant array of independent disks (RAID) stripe, wherein each free physical location is distributed across an independent fault domain (IFD);
      determine a first aggregate failure rate of the first new RAID stripe;
      make a first determination that the first aggregate failure rate exceeds a failure rate threshold for the storage array;
      select, based on the first determination, a second set of free physical locations in the plurality of SDs to form a second new RAID stripe, comprising:
        replacing a first free physical location of the first set of free physical locations with a second free physical location in the plurality of SDs, wherein the first and second free physical locations reside in the same SD;
      determine a second aggregate failure rate of the second new RAID stripe;
      make a second determination that the second aggregate failure rate is less than the failure rate threshold for the storage array;
      based on the second determination:
        calculate a parity value using at least a portion of the data; and
        write the data and the parity value to the second set of free physical locations forming the second new RAID stripe.

10. The system of claim 9, wherein the controller is further configured to: prior to making the first determination:
  obtain a plurality of individual failure rates associated with the plurality of SDs; and
  determine the failure rate threshold using at least a portion of the plurality of individual failure rates.

11. The system of claim 9, wherein the controller is further configured to:
  after writing the data and the parity value to the second set of physical free physical locations forming the second new RAID stripe:
    obtain a second plurality of individual failure rates for the plurality of SDs; and
    determine a second failure rate threshold using at least a portion of the second plurality of individual failure rates, wherein the second failure rate threshold is different than the failure rate threshold.

12. The system of claim 9, wherein the controller is further configured to:
  after writing the data and the parity value to the second set of physical free physical locations forming the second new RAID stripe and after a least a portion of the plurality of SDs is replaced to obtain a second plurality of SDs:
    obtain a second plurality of individual failure rates for the second plurality of SDs; and
    determine a second failure rate threshold using at least a portion of the second plurality of individual failure rates, wherein the second failure rate threshold is different than the failure rate threshold.

13. The system of claim 9, wherein the controller is further configured to:
  receive a second request to write second data;
  in response to the second request:
    select a third set of free physical locations in the persistent storage to form a third new RAID stripe;
    determine a third aggregate failure rate of the third new RAID stripe;
    make a third determination that the third aggregate failure rate exceeds the failure rate threshold for the storage array;
    based on the third determination:
      make a fourth determination that there are no additional combinations of free physical locations to select;
      based on the fourth determination:
        issue an error notification to a client that issued the second request.

14. The system of claim 13, wherein the controller is further configured to:
  after making the fourth determination, initiate an updating of the failure rate threshold.

15. The system of claim 9, wherein at least one of the plurality of SDs comprises NAND flash.

16. A non-transitory computer readable medium comprising instructions, which when executed by at least one processor perform a method, the method comprising:
  receiving a request to write data;

in response to the request:
   selecting a first set of free physical locations across a plurality of storage devices to form a first new redundant array of independent disks (RAID) stripe, wherein each free physical location is distributed across an independent fault domain (IFD);
   determining a first aggregate failure rate of the first new RAID stripe;
   making a first determination that the first aggregate failure rate exceeds a failure rate threshold for the plurality of storage devices;
   selecting, based on the first determination, a second set of free physical locations across the plurality of storage devices to form a second new RAID stripe, comprising:
      replacing a first free physical location of the first set of free physical locations with a second free physical location across the plurality of storage devices, wherein the first and second physical locations reside in the same storage device;
   determining a second aggregate failure rate of the second new RAID stripe;
   making a second determination that the second aggregate failure rate is less than the failure rate threshold for the plurality of storage devices;
   based on the second determination:
      calculating a parity value using at least a portion of the data; and
      writing the data and the parity value to the second set of free physical locations forming the second new RAID stripe.

17. The non-transitory computer readable medium of claim 16, the method further comprising:
   prior to making the first determination:
      obtaining a plurality of individual failure rates associated with the plurality of storage devices; and
      determining the failure rate threshold using at least a portion of the plurality of individual failure rates.

18. The method of claim 1, wherein the first free physical location exhibits a highest individual failure rate across the first set of free physical locations.

19. The system of claim 9, wherein the first free physical location exhibits a highest individual failure rate across the first set of free physical locations.

20. The non-transitory computer readable medium of claim 16, wherein the first free physical location exhibits a highest individual failure rate across the first set of free physical locations.

* * * * *